Jan. 8, 1946.　　　　G. J. BAIR　　　　2,392,568
METHOD OF FORMING SILICIOUS BODIES
Filed Nov. 16, 1940　　　3 Sheets-Sheet 1

Inventor
GEORGE J. BAIR

By Olew E. Bee
Attorney

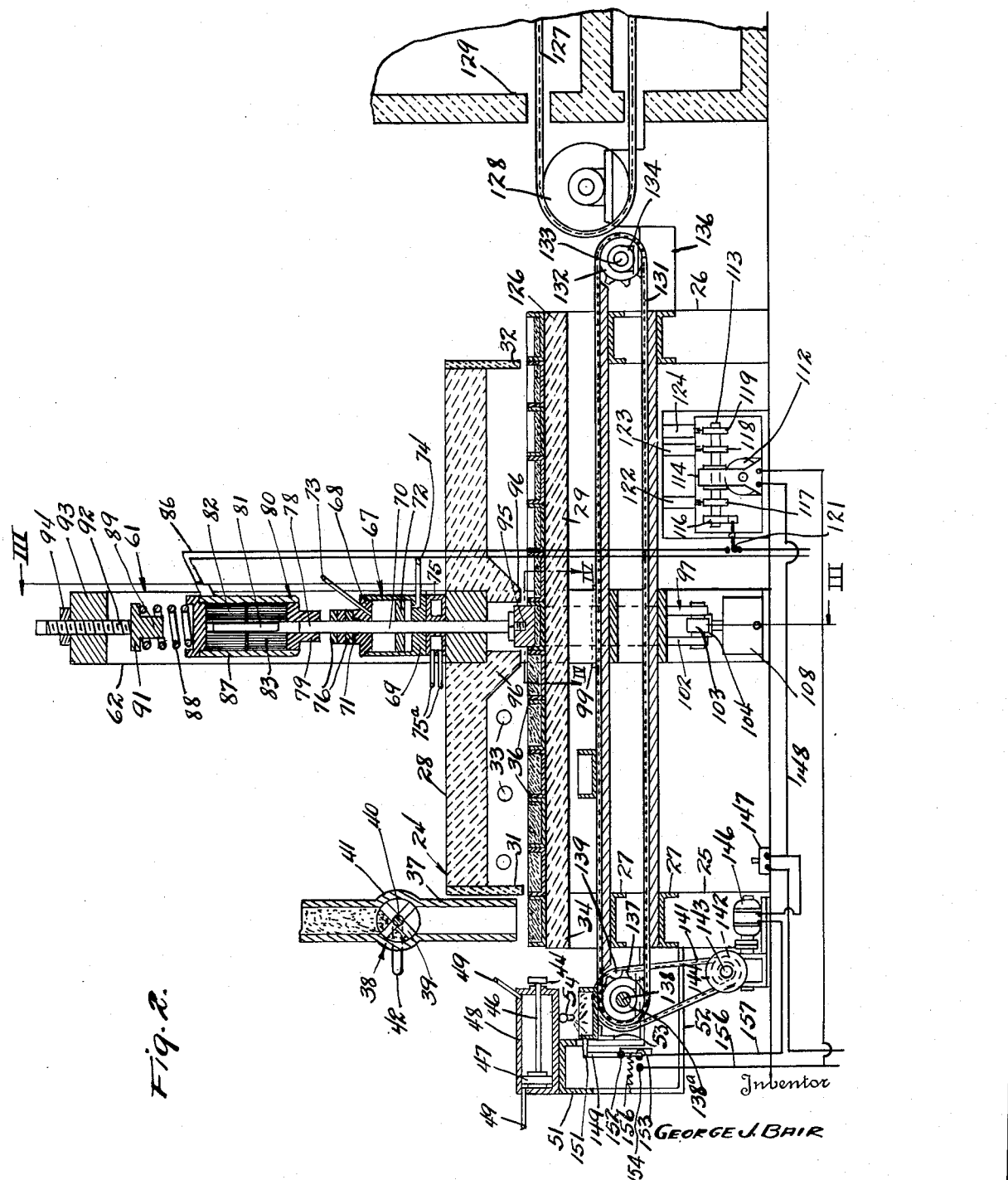

Jan. 8, 1946. G. J. BAIR 2,392,568
METHOD OF FORMING SILICIOUS BODIES
Filed Nov. 16, 1940 3 Sheets-Sheet 3
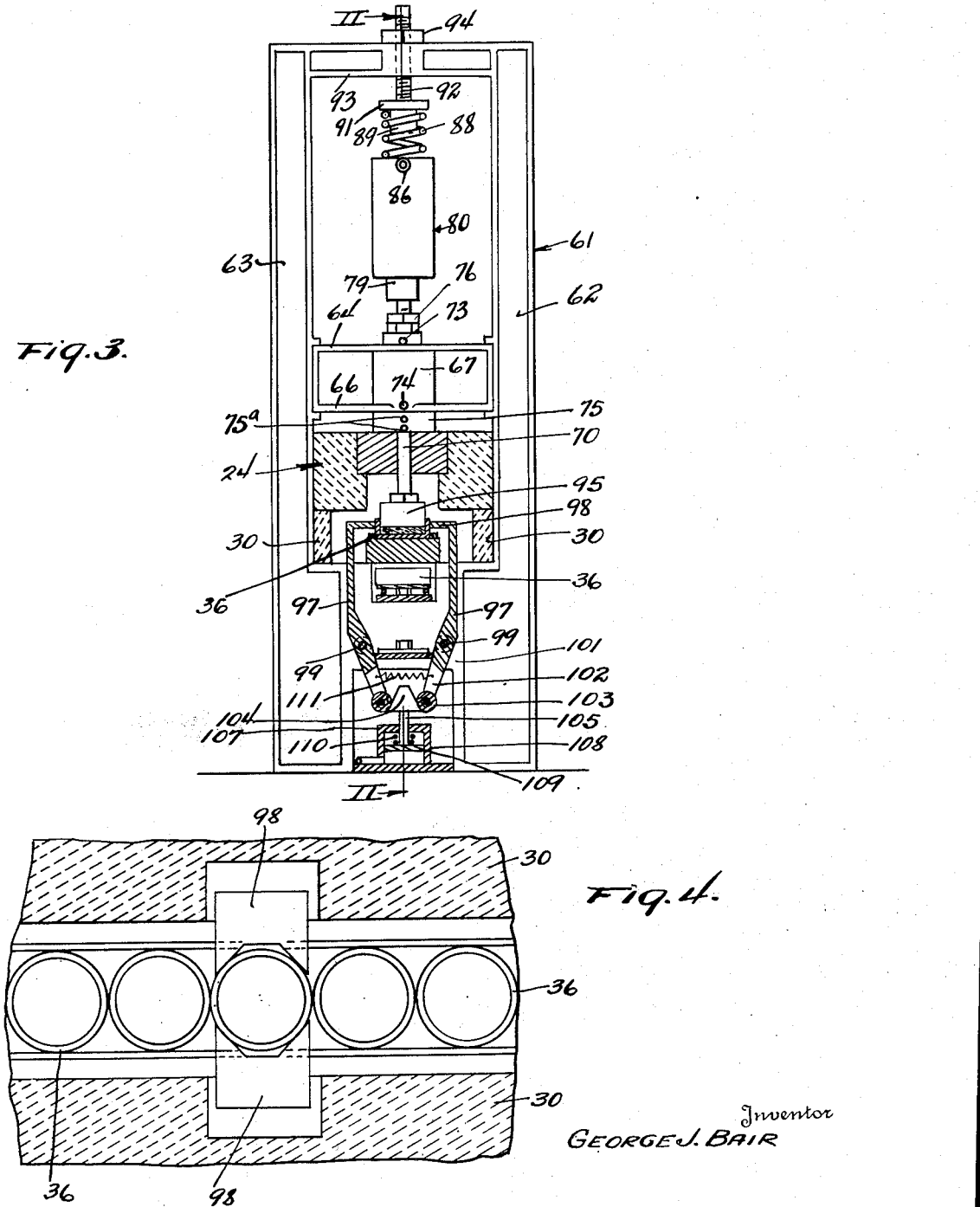

Patented Jan. 8, 1946

2,392,568

UNITED STATES PATENT OFFICE 2,392,568

METHOD OF FORMING SILICIOUS BODIES

George J. Bair, Pittsburgh, Pa., assignor to Norbert S. Garbisch, Butler, Pa.

Application November 16, 1940, Serial No. 365,870

4 Claims. (Cl. 49—85)

The present invention relates to the manufacture of artificial silicious bodies and it has particular relation to the manufacture of bodies suitable for use as substitutes for conventional ceramic wares.

One object of the invention is to provide a process of utilizing the broken-down and heretofore substantially valueless mixture of finely divided silica and glass obtained in the grinding operations involved in the finishing of such sheets or plates of glass as are employed in the glazing of automobiles, windows of buildings and the like.

A second object of the invention is to provide a body similar to conventional ceramic products, but which is characterized by an exceptionally high degree of resistance to chemical and physical deterioration and which possesses unusual mechanical strength.

These and other objects of the invention will be apparent from the consideration of the following specification and the appended claims.

In the finishing of the better grades of sheet or plate glass, it is customary to subject the plates to a grinding operation in order to reduce or eliminate the irregularities in the surfaces thereof. The grinding operation customarily is effected by cementing the plates of glass to moving cars or tables which are then passed under revolving disks or runners of cast iron. A slurry or suspension of sand and water is simultaneously supplied to the surface of the glass and this slurry, under the pressure of the runners, gradually abrades away the irregularities. The abrasion involves the removal of minute chips or slivers of glass and is also accompanied by the wearing down and breaking up of the particles of sand into finer and finer states of subdivision. From time to time the mixture is subjected to a classification operation in which the coarser particles are separated and are returned for reuse in the cycle. The finer material is advanced for use in subsequent stages in making the finer cuts in the grinding operation, or if the particles are too fine for the latter, they are discarded. Ultimately all of the sand is thus broken down to such fine state of subdivision that it can no longer be employed in the grinding of glass. The mass usually consists of an extremely intimate mixture of glass and sand containing about 12 to 20 per cent of glass and small amounts (e. g.) about 2 or 3 per cent of iron. This iron may be in the form of oxides, such as occur naturally in many sands, or it may comprise minute fragments of metallic iron broken away from the cast iron runner blocks. A small amount of plaster from the grinding tables, organic matter, and other waste material is also present. The particle size of the solids in this mixture is such that nearly all of it will pass through a screen of 300 or 325 mesh.

Heretofore the impure mixture of silicious particles thus obtained has been considered as being of no value and has been run to waste upon dumps or into streams. In either event, since hundreds of thousands of tons are produced annually it has constituted a serious nuisance about the glass plant.

The present invention involves the provision of a process in which wastes from the grinding and polishing of glass are subjected to a temperature slightly above the sintering point of the glass content and simultaneously to intense vibration in a form or mold in order to compact the particles and to cause them to cohere into a dense, strong body.

For a better understanding of the invention reference may now be had to the accompanying drawings in which:

Figures 2 and 3 are sectional views of a further form of the invention in which Figure 2 is taken upon the line II—II of Figure 3 and Figure 3 is taken upon the line III—III of Figure 2;

Figure 4 is a fragmentary sectional view upon the line IV—IV of Figure 2.

Figure 1:
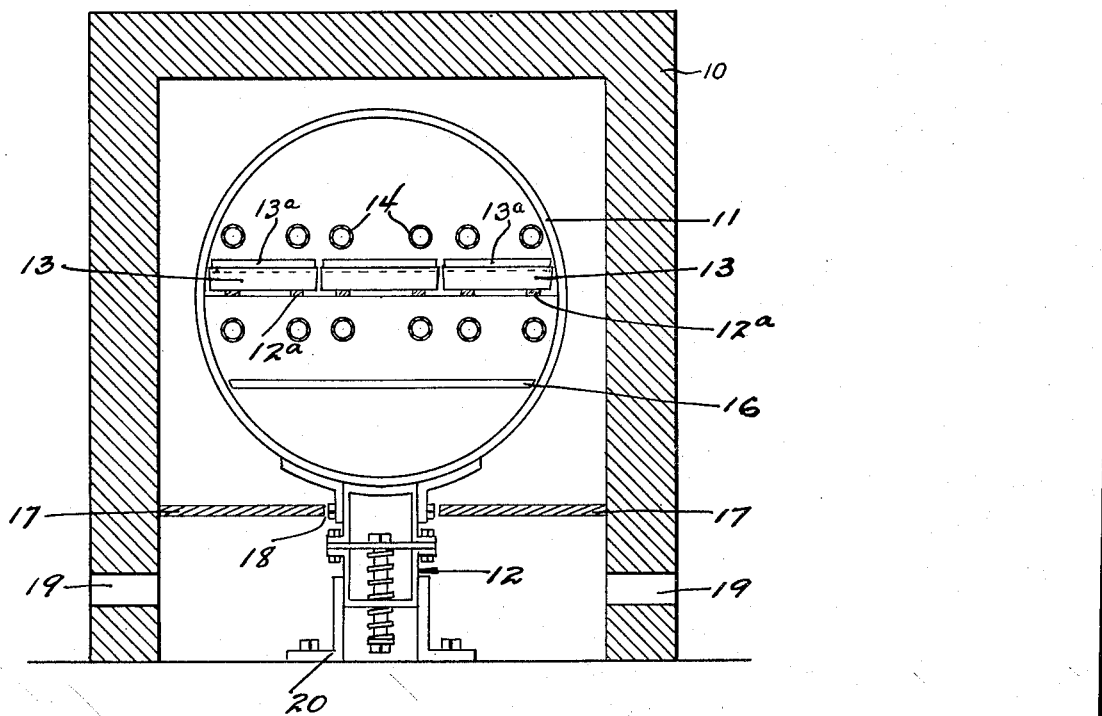
Figure 1 is a sectional view of an embodiment of apparatus for practicing the invention.

The waste material employed in preparing the new product may be taken directly from the grinding tables and dried for use, or material which has been stored in dumps may be employed. The material is susceptible of use without preliminary treatment; however, in order to provide a white product, it may be desirable to remove the iron contained therein. The major portion of the metallic iron is easily removed by treating sand while in suspension in water, or after it has been dried, with a magnetic separator. However, in order to remove non-magnetic compounds of iron, the material should be chemically treated—for example, with dilute (5 or 10%) sulfuric acid.

This sand, as previously stated, contains about 12 to 20 per cent of very finely divided glass and this is sufficient under appropriate conditions to bond together the particles of silica, to provide a strong durable body. However, if it is desired further to reduce the porosity of the final product, additional quantities of ground glass or even ground blast furnace slag may be incorporated. A convenient method of making the addition would involve stirring the glass or slag with the slurry or suspension of sand as it is received from the grinding tables. The amount of added material is variable over practically any range from substantially zero to substantially one hundred per cent of the entire mass.

In Fig. 1 of the drawings is illustrated an embodiment of apparatus in which the waste material in suitable containers is subjected simultaneously to intense vibration and to heat in order to sinter the glass particles. This apparatus preferably comprises an outer chamber 10 of non-conductive material which is designed to prevent excessive heat loss.

A shell 11 of chrome steel or some other relatively heat-resistant material is disposed within the chamber 10 and may be supported upon an electrical vibrator 12 supported by brackets 20 and being designed to operate for example at a frequency of 60 cycles per second. The vibrator may be of the platform type such as is conventionally employed for the settling and compacting of material in containers or drums. Vibrators of suitable construction are sold under the trade name "Syntron" by the Syntron Company, of Homer City, Pennsylvania. A suitable shelf or a series of shelves 12a, preferably of grid-like construction are disposed transversely of the container and constitute supports for a mold or a series of molds 13 in which waste sand for forming the bodies constituting the subject matter of the present invention may be disposed.

If desired, covers 13a comprising relatively heavy metallic plates may be placed upon the material in the molds and assist in forming a smooth upper surface upon the bodies. They also provide anvils against which the vibrating mixture is pressed by vibration.

In order to sinter the particles of glass contained in the waste sand, suitable heating means is provided within the container. These may be of any convenient form, e. g., electrical resistance elements, or as shown in the drawings they may comprise a series of gas burners 14, disposed in proximity to the containers for the waste material. The burners may be supported independently of the shell 11, for example by the end walls of chamber 10 in order to leave the mass free to vibrate.

A shelf or partition 16 may also be supported within the container preferably by the end walls of the chamber 10, in such manner as to protect the lower portion of the container which is attached to the electrical vibrator 12 from excessive heat from the burners 14. The vibrator may further be protected from heat radiated from the shell 11 by means of a transverse partition 17 disposed in the chamber 10 in close proximity to the lower portion of the shell. The vibrator extends through an opening 18 in the shelf or partition in such manner that the more heat-sensitive elements such as the electrical coils are protected from heat radiated downwardly in the chamber 10. The temperature about the vibrator may, also, be further reduced by the formation of ports 19 in the lower portion of the chamber 10 in such manner as to admit of circulation of air in the space below the partition 17.

In the operation of this embodiment of the invention waste sand, either in the crude state or after treatment to remove iron therefrom, is introduced in appropriate amounts into the pan-like molds 13. The latter are then introduced into the shell 11 and are gradually heated by the burners 14 to such temperature as to cause sintering of the glass content of the sand. A temperature of about 1600 or 1700° F. is usually sufficient for the purpose. During the heating operation the shell 11 is strongly vibrated by the vibrator 12 to induce settling of the contents of the molds. Ultimately the particles of silica in the waste sand become compacted and at the same time they are bonded together into a coherent mass which may be removed from the shell 11 and annealed in a suitable leer (not shown).

In the form of the invention as disclosed in Figures 2, 3 and 4 is disclosed apparatus for applying vibrations as a rapid series of impacts to waste sand disposed in suitable molds. The apparatus includes tunnel 24 carried upon uprights 25 and 26, which are interconnected transversely of the tunnel by means of cross-bars 27. The tunnel includes a top wall 28, a bottom 29, side walls 30 and ends 31 and 32 all formed of any suitable relatively refractory material. The section of the tunnel contiguous to the entrance end is heated in any convenient manner, for example, by means of a series of gas burners 33, which project through side walls 30. The extremity of the bottom 29 at the entrance end of the tunnel projects forwardly a short distance as indicated at 34 to provide a ledge upon which molds 36 may be supported while they are being filled preparatory to passing them through the tunnel.

The filling operation may be performed in any convenient manner, for example, by means of a downwardly extending chute 37 connected to a storage bin, or to a preheating furnace (not shown). The waste sand may be at any convenient temperature, either cold, or preheated, e. g., to 1000 or 1100° F. The waste sand is metered or measured into a mold 36 upon the shelf or ledge 34, by means of a valve-like rotor 38, comprising radial paddles or vanes 39 upon a shaft 40 rotating in a chamber 41, which in effect constitutes an enlargement of circular vertical section of the chute or conduit 37. The rotor may be operated by means of a handle or other convenient device 42 which is connected to shaft 40 to deposit sand in the molds. The rotor preferably is of such size that the portion of waste sand between two adjacent plates or vanes is just sufficient adequately to load or charge a mold 36.

The molds are advanced successively into the tunnel or kiln 25 by means of a piston head 44 carried on a piston rod 46 of a piston 47 reciprocating within a closed cylinder 48. Air under compression or any other convenient actuating fluid may be admitted at opposite ends of the cylinder 48 by means of conduits 49. It will be noted that the cylinder is supported upon column 51 extending upwardly from a bracket 52 which is mounted upon legs 25 supporting the tunnel kiln. The column also supports a ledge 53 designed to support a mold 36 preparatory to the filling operation. While the mold is so supported a smoking flame from a burner 54 may be allowed to play there within, in order to deposit upon the inner surfaces thereof a thin coating of carbon black designed to prevent adhesion of the heated glass in the waste sand during the various operations within the kiln 24.

Mechanism for compacting the heated waste sand in the molds includes a press 61 comprising spaced uprights 62 and 63 disposed upon opposite sides of the tunnel kiln. These uprights as best shown in Figure 3 are interconnected by a pair of cross beams 64 and 66, which may be formed integrally with a cylinder 67 having an upper head 68 and a lower head 69. A piston rod 70 extends through packing glands 71 in these heads and is provided with a piston 72 reciprocating within the cylinder. The cylinder is also provided at its extremities with conduits 73 and 74 for admission of fluid under compression to actuate the piston. A hollow cooling collar 75 having conduits 75a for cooling fluid is disposed about the rod but fits sufficiently loosely to permit the latter to be raised and lowered and to vibrate freely. Nuts 76 may conveniently be threaded upon the upper extremity of the piston rod to provide stops limiting the downward motion of the piston at any predetermined level.

At its upper extremity a portion 78 of the piston rod 70 is fitted within a chuck 79 of a suitable hammer device 80, for example, an electrical hammer including a reciprocating or vibrating hammer element 81 designed to strike the upper extremity of the rod 70. This hammer may be oscillated or vibrated in any convenient manner, e. g. by means of electrical coils 82 and 83, which are excited by an alternating current of a frequency for example of 3600 cycles per minute. This current is supplied by means of bus lines 86 extending to a suitable source of supply. The coils 82 and 83 conveniently are housed in a suitable case 87 upon the upper extremity of which a coil spring 88 is designed to bear. The upper extremity of this spring fits over a downwardly-projecting plug 89 and bears against flange 91 upon the latter. The plug in turn is attached to a large screw 92, which is threaded through a cross-bar 93 interconnecting the upper extremities of the uprights 62 and 63. A nut 94 upon the screw functions to lock the latter in desired position of adjustment.

At its lower extremity rod 70 is provided with a tamping head 95, which is disposed between downwardly-projecting shoulders 96 that divide the kiln into front and rear compartments. The shoulders permit the waste sand to be heated up to a point immediately adjacent to the tamper 95 but prevent excessive heat from playing upon the latter. The head 95 is designed to be raised or lowered into or from engagement with the waste sand in a mold 36, by the suitable admission of actuating fluid to the cylinder 67.

A suitable centering device for accurately aligning each of the molds with the tamping head is best shown in Figure 3 and includes a pair of upwardly-extending arms 97 having jaws 98, shown in Figure 4 upon their upper extremities, so formed as to grip molds 36 when the arms are swung toward each other. The arms 97 may conveniently be pivoted upon studs 99 projecting from cross-member 101, that interconnects the uprights 62 and 63. Arms 102, integral with arms 97, project downwardly from studs 99 and at their lower extremities are provided with rollers 103 which bear upon opposite faces of a wedge-like member 104 upon the upper extremity of the piston rod 105. The rod extends downwardly through head 107 of a cylinder 108 and is provided at its lower extremity with a piston 109 which reciprocates within the cylinder. A coil spring 110 may bear upon the upper surface of the piston and normally urges the piston 105 to retracted position. The arms 97 are also urged to retracted position by means of a tension spring 111, which interconnects the arms 102.

Mechanism for operating piston 47, hammer 81, piston 72 and piston 109 in desired sequence may include a cam mechanism involving a driving motor 112, which actuates through suitable reducing mechanism (not shown), a shaft 113 rotating horizontally in a pedestal 114. This shaft is provided with cams 116, 117, 118 and 119. The first of these is designed to operate a suitable electrical switch 121 disposed in the circuit of the coils 82 and 83, in order to control the supply of current to the electrical hammer. The second cam (117) actuates a valve mechanism 122 designed to control the admission of fluid through conduits 49 to the cylinder 48. Cams 118 and 119 respectively operate valves 123 and 124, which respectively control the admission of fluid to the cylinders 67 and 108.

Molds 36 containing the pressed tiles or bodies are received upon an unloading platform 126, which in effect constitutes an extension of the bottom 34 of the tunnel kiln. At this point the molds are inverted and the tiles are deposited upon a conveyor, which may comprise a chain or belt 127 running upon a drum 128. This conveyor extends through a second tunnel 129 in which the tiles may be reheated for glazing or if preferred may merely be annealed in order to remove any internal strains therefrom.

The empty molds conveniently are returned to the starting point by means of a chain conveyor 131, which at one extremity is trained about sprockets 132 upon a shaft 133, which is journaled in bearings 134, upon brackets 136 supported by legs 26. At its opposite extremity the conveyor may be trained about sprockets 137 upon a shaft 138, which may be journaled in bearings 138a, supported upon bracket 52 already described. Shaft 138 is further provided with a sprocket 139 upon which is trained a drive chain 141, which is driven by a sprocket 142. The latter is keyed upon the driving shaft 143 of a suitable speed-reducing mechanism 144, which in turn is driven in conventional manner by a motor 146, that may be started or stopped at will by means of a control switch 147 suitably connected in power line 148 that has leads to the motors.

Mechanism for automatically starting and stopping the conveyor chain 131 while the molds are being coated with carbon black by the burner 54 includes a switch mechanism comprising an arm 149 having a bracket 151 extending into the path of the molds 36 as they reach their backward limit of travel. The arm is pivoted as indicated at 152 to column 51 and has a downwardly-extending portion 153 designed to contact with a point 154. A tension spring 156 urges the portion 153 toward the point. The point and the portion 153 are connected to lines 156 and 157, the latter of which extends to the motor 146, in order to supply current thereto. However, when a mold contacts with bracket 151 the arm 149 is operated to break the circuit and thus stop motor 146.

In the operation of the mechanism described switch 147 is closed to actuate motors 112 and 146. A mold upon the shell 53 is then given a superficial coating of carbon black by the burner 54, after which the mold is deposited upon the shelf 34. Member 39 is rotated by means of handle 42, in order to deposit a suitable quantity of waste sand in the mold, and, subsequently, fluid under compression is admitted to cylinder 48 in order to actuate piston rod 46 forwardly to impel the mold into the tunnel kiln 24. Additinal molds may then be coated with black and filled with waste sand and in turn pushed into the kiln. Each mold actuates the mold in front of it forwardly under the burners 33 toward the tamping head 95, which is held in a raised position.

By the time a mold reaches the latter the cam 119 will have rotated to open valve 124 and thus to actuate the piston rod 105, to swing arms 97 towards each other and in turn to cause the jaws 98 to grip the mold, thereby accurately aligning it with the tamping head 95. The cam 118 will then have so rotated as to actuate valve 123 to release the pressure from the lower portion of the cylinder 67, thereby lowering the tamping head 95 into contact with the waste sand to be compacted. The pressure if desired may be increased by the admission of fluid to the upper portion of the cylinder 67 at this point. By this time the cam 116 will have rotated to such point as to actuate the switch 121 and thus to supply an alternating current to the coils 83 and 84. These coils cause the hammer 81 to vibrate or oscillate rapidly and thus to apply a quick series of sharp blows to the upper extremity of the rod 70. The waste sand in the molds is thus simultaneously subjected to pressure and a vibration or hammering action, which quickly compacts the material, thus insuring that the particles of silica will be thoroughly contacted with the particles of sintered glass therebetween. A strong and coherent body is thus insured.

Manifestly, the blows should be sufficiently powerful and be repeated a sufficient number of times to insure that the masses in the molds will be thoroughly and relatively uniformly compacted throughout their thickness. This effect may be obtained by a few powerful blows or many small blows.

It is to be understood that waste sand from glass grinding operations is ideally suited for the purposes of the present invention. However, a mixture of finely divided glass and sand from other sources might also be employed. Preferably the sand content of such mixture is maintained sufficiently high that the glass content does not completely coalesce into a solid body, thus in effect forming a continuous glass phase in which while hot constitutes a fluid mass containing the particles of silica immersed and suspended therein and completely wet thereby. In most instances the particles of silica will be bonded together by individual particles of glass and the mass will never behave as a plastic body of molten glass.

Doubtless, bonding of the particles is promoted by the movements of the particles which cause particles of sintered glass to contact with other particles of glass and silica, thus affecting a stronger union than would otherwise be obtained.

This application is a continuation in part of copending application Serial No. 224,308, filed August 11, 1938.

This application has now issued as Patent 2,247,270, as of June 24, 1941.

The form of the invention disclosed is given merely by way of example. It will be apparent that numerous modifications may be made therein without departure from the spirit of the invention or the scope of the appended claims.

What I claim is:

1. A process of forming a strong dense body from a mixture of finely-divided silica and glass, which process comprises compacting the mixture in a mold while it is heated to a temperature above that of sintering of the glass and below that of sintering of the silica by a series of strong hammer-like blows, the glass content of the mixture being insufficient to form a continuous plastic phase.

2. A process of forming hard, coherent and relatively dense bodies from waste sand from the grinding and polishing of glass with sand as an abrasive, which process comprises tamping the sand by a series of blows under a tamping head in a mold, while the waste sand is at a temperature above the sintering point of its glass content but below that of melting of its silica content.

3. A process of forming a strong dense body from a mixture of finely divided silica and glass which process comprises compacting the mixture in a mold while it is at a temperature above that of sintering of the glass and below that of sintering of the silica by simultaneous application continuous mechanical pressure and a series of strong hammer blows, in the process the glass content of the mixture being insufficient to form a continuous plastic phase.

4. A process of forming a strong dense body from a mixture of finely-divided silica and glass resulting from the grinding of plate glass with a slurry of sand as an abrasive, which process comprises heating the mixture in a suitable mold to a temperature of about 1600 to 1700° F. and subjecting it to a series of strong hammer-like impacts in order to cohere the particles and subsequently annealing and cooling the resultant body.

GEORGE J. BAIR.